United States Patent
Yadav et al.

(10) Patent No.: US 9,654,409 B2
(45) Date of Patent: May 16, 2017

(54) METHOD FOR SCALING ADDRESS LOOKUPS USING SYNTHETIC ADDRESSES

(71) Applicant: Cisco Technology, Inc., San Jose, CA (US)

(72) Inventors: Navindra Yadav, Cupertino, CA (US); Satyam Sinha, Sunnyvale, CA (US); Thomas J. Edsall, Los Gatos, CA (US); Mohammadreza Alizadeh Attar, Santa Clara, CA (US); Kit Chiu Chu, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 178 days.

(21) Appl. No.: 14/475,349

(22) Filed: Sep. 2, 2014

(65) Prior Publication Data
US 2015/0124805 A1    May 7, 2015

Related U.S. Application Data

(60) Provisional application No. 61/900,369, filed on Nov. 5, 2013.

(51) Int. Cl.
| | |
|---|---|
| *H04L 12/863* | (2013.01) |
| *H04L 12/937* | (2013.01) |
| *H04L 29/08* | (2006.01) |
| *H04L 12/875* | (2013.01) |
| *H04L 12/06* | (2006.01) |
| *H04L 12/743* | (2013.01) |

(Continued)

(52) U.S. Cl.
CPC .............. *H04L 47/50* (2013.01); *H04L 45/74* (2013.01); *H04L 45/7453* (2013.01); *H04L 47/125* (2013.01); *H04L 47/56* (2013.01); *H04L 49/25* (2013.01); *H04L 49/254* (2013.01); *H04L 61/6004* (2013.01); *H04L 61/6095* (2013.01); *H04L 67/22* (2013.01); *H04L 67/322* (2013.01); *H04L 69/167* (2013.01); *H04L 69/22* (2013.01); *H04L 61/103* (2013.01); *H04L 61/2084* (2013.01)

(58) Field of Classification Search
None
See application file for complete search history.

(56) References Cited

U.S. PATENT DOCUMENTS

| | | |
|---|---|---|
| 6,098,109 A | 8/2000 | Kotzur et al. |
| 6,434,662 B1 | 8/2002 | Greene et al. |

(Continued)

*Primary Examiner* — Brandon Renner
*Assistant Examiner* — Jay Vogel
(74) *Attorney, Agent, or Firm* — Polsinelli PC

(57) ABSTRACT

Various examples of the present disclosure provide methods for unifying various types of end-point identifiers, such as IPv4 (e.g., Internet protocol version 4 represented by a VRF and an IPv4 address), IPv6 (e.g., Internet protocol version 6 represented by a VRF and an IPv6 address) and L2 (e.g., Layer-2 represented by a bridge domain (BD) and a media access control (MAC) address), by mapping end-point identifiers to a uniform space (e.g., a synthetic IPv4 address and a synthetic VRF) and allowing different forms of lookups to be uniformly handled. In some examples, a lookup database residing on a switch device can be sharded into a plurality of lookup table subsets, each of which resides on a different one of multiple switch chipsets (e.g., Tridents) in the switch device.

11 Claims, 9 Drawing Sheets

(51) Int. Cl.
  *H04L 12/947* (2013.01)
  *H04L 12/741* (2013.01)
  *H04L 29/12* (2006.01)
  *H04L 12/803* (2013.01)
  *H04L 29/06* (2006.01)

(56) References Cited

U.S. PATENT DOCUMENTS

| | | | |
|---|---|---|---|
| 7,103,035 B1 * | 9/2006 | Kanuri | H04L 29/12009 370/356 |
| 7,426,185 B1 | 9/2008 | Musacchio et al. | |
| 7,580,409 B1 | 8/2009 | Swenson et al. | |
| 7,724,760 B2 | 5/2010 | Balakrishnan et al. | |
| 8,259,571 B1 * | 9/2012 | Raphel | H04L 61/2592 370/230 |
| 8,391,289 B1 * | 3/2013 | Yalagandula | H04L 12/2818 370/392 |
| 2003/0174710 A1 | 9/2003 | Gooch | |
| 2004/0090913 A1 * | 5/2004 | Scudder | H04L 45/02 370/219 |
| 2005/0147095 A1 | 7/2005 | Guerrero et al. | |
| 2006/0050632 A1 | 3/2006 | Griggs | |
| 2007/0115982 A1 * | 5/2007 | Pope | H04L 45/742 370/392 |
| 2010/0287171 A1 * | 11/2010 | Schneider | G06F 17/30949 707/759 |
| 2011/0026403 A1 | 2/2011 | Shao et al. | |
| 2012/0163164 A1 * | 6/2012 | Terry | H04L 45/24 370/221 |
| 2012/0207175 A1 | 8/2012 | Raman et al. | |
| 2014/0114995 A1 * | 4/2014 | Kelley | H04L 45/38 707/758 |
| 2014/0122743 A1 * | 5/2014 | Di Benedetto | H04L 69/22 709/250 |
| 2014/0173129 A1 * | 6/2014 | Basso | H04L 12/5689 709/238 |
| 2015/0124614 A1 | 5/2015 | Alizadeh Attar et al. | |
| 2015/0124820 A1 | 5/2015 | Alizadeh Attar et al. | |

\* cited by examiner

METHOD FOR SCALING ADDRESS LOOKUPS USING SYNTHETIC ADDRESSES

CROSS REFERENCE TO RELATED APPLICATION

This application is a continuation of U.S. Patent Application No. 61/900,369, filed Nov. 5, 2013, which is expressly incorporated herein by reference in its entirety.

TECHNICAL FIELD

The present disclosure relates generally to address lookups in a telecommunications network.

BACKGROUND

Address lookup is a common operation performed by many Internet switches and routers. Looking up an address in a table is usually combined with a hashing operation and the performance of the lookup process depends on both the hash function and table organization. Doing a lookup operation means searching for an address in the table. The challenges in the field of address lookup continue to increase with demands for faster techniques having greater flexibility and adaptability.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which.

DESCRIPTION OF EXAMPLE ASPECTS

Figure 1:
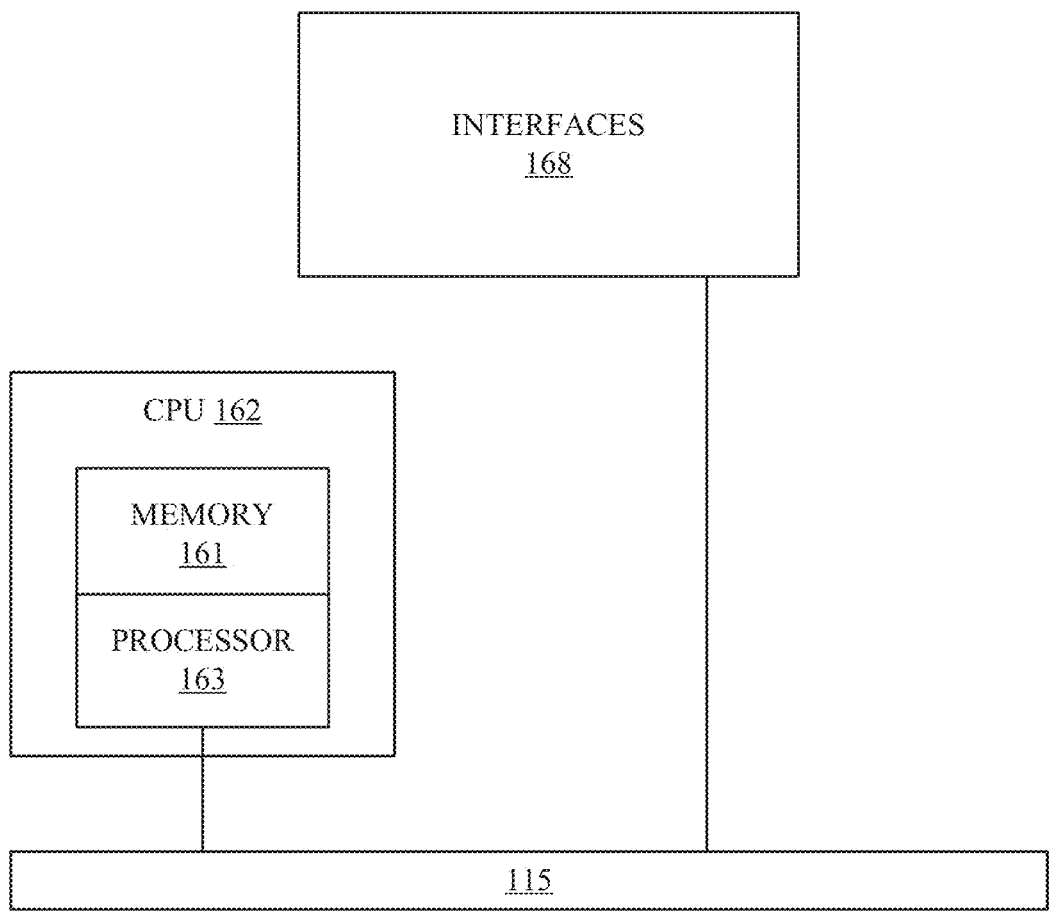
FIG. 1 illustrates an example network device in accordance with various implementations of the technology.

Various examples of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Systems and methods in accordance with various aspects of the present disclosure provide a solution to the above-mentioned need by unifying various types of end-point identifiers, such as IPv4 (e.g., Internet protocol version 4 represented by a VRF and an IPv4 address), IPv6 (e.g., Internet protocol version 6 represented by a VRF and an IPv6 address) and L2 (e.g., Layer-2 represented by a bridge domain (BD) and a media access control (MAC) address), by mapping end-point identifiers to a uniform space (e.g., a synthetic IPv4 address and a synthetic VRF) and allowing different forms of lookups to be uniformly handled. In some examples, a lookup database residing on a switch device can be sharded into a plurality of lookup table subsets, each of which resides on a different one of multiple switch chipsets (e.g., Tridents) in the switch device. Therefore, a lookup database with improved scale, capacity and flexibility can be accomplished.

Description

A computer network is a geographically distributed collection of nodes interconnected by communication links and segments for transporting data between endpoints, such as personal computers and workstations. Many types of networks are available, with the types ranging from local area networks (LANs) and wide area networks (WANs) to overlay and software-defined networks, such as virtual extensible local area networks (VXLANs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective "size" of each network.

Overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs).

Moreover, overlay networks can include virtual segments, such as VXLAN segments in a VXLAN overlay network, which can include virtual L2 and/or L3 overlay networks over which VMs communicate. The virtual segments can be identified through a virtual network identifier (VNI), such as a VXLAN network identifier, which can specifically identify an associated virtual segment or domain.

Network virtualization allows hardware and software resources to be combined in a virtual network. For example, network virtualization can allow multiple numbers of VMs to be attached to the physical network via respective virtual LANs (VLANs). The VMs can be grouped according to their respective VLAN, and can communicate with other VMs as well as other devices on the internal or external network.

Network segments, such as physical or virtual segments, networks, devices, ports, physical or logical links, and/or traffic in general can be grouped into a bridge or flood domain. A bridge domain or flood domain can represent a broadcast domain, such as an L2 broadcast domain. A bridge domain or flood domain can include a single subnet, but can also include multiple subnets. Moreover, a bridge domain can be associated with a bridge domain interface on a network device, such as a switch. A bridge domain interface can be a logical interface which supports traffic between an L2 bridged network and an L3 routed network. In addition, a bridge domain interface can support internet protocol (IP) termination, VPN termination, address resolution handling, MAC addressing, etc. Both bridge domains and bridge domain interfaces can be identified by a same index or identifier.

Furthermore, endpoint groups (EPGs) can be used in a network for mapping applications to the network. In particular, EPGs can use a grouping of application endpoints in a network to apply connectivity and policy to the group of applications. EPGs can act as a container for buckets or collections of applications, or application components, and tiers for implementing forwarding and policy logic. EPGs also allow separation of network policy, security, and forwarding from addressing by instead using logical application boundaries.

Cloud computing can also be provided in one or more networks to provide computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, and network devices, virtual machines (VMs), etc. For instance, resources may include service devices (firewalls, deep packet inspectors, traffic monitors, load balancers, etc.), compute/processing devices (servers, CPU's, memory, brute force processing capability), storage devices (e.g., network attached storages, storage area network devices), etc. In addition, such resources may be used to support virtual networks, virtual machines (VM), databases, applications (Apps), etc.

Cloud computing resources may include a "private cloud," a "public cloud," and/or a "hybrid cloud." A "hybrid cloud" can be a cloud infrastructure composed of two or more clouds that inter-operate or federate through technology. In essence, a hybrid cloud is an interaction between private and public clouds where a private cloud joins a public cloud and utilizes public cloud resources in a secure and scalable manner. Cloud computing resources can also be provisioned via virtual networks in an overlay network, such as a VXLAN.

In a network switch system, a lookup database is maintained to keep track of routes between a number of end points attached to the switch system. However, end points may have various configurations and are associated with numerous tenants. These end-points may have various types of identifiers, e.g., IPv4, IPv6, or Layer-2. The lookup database has to be configured in different modes to handle different types of end-point identifiers. Some capacity of the lookup database is carved out to deal with different address types of incoming packets. Further, the lookup database on the network switch system is typically limited by 1K virtual routing and forwarding (VRFs). Therefore, an improved lookup algorithm is desired to handle various types of end-point identifiers. The disclosed technology addresses the need in the art for address lookups in a telecommunications network. Disclosed are systems, methods, and computer-readable storage media for unifying various types of end-point identifiers by mapping end-point identifiers to a uniform space and allowing different forms of lookups to be uniformly handled. A brief introductory description of example systems and networks, as illustrated in FIGS. 1 through 4, is disclosed herein. A detailed description of an example process for generating synthetic IP addresses for incoming packets and sharding a lookup table across multiple switch chipsets, related concepts, and exemplary variations, will then follow. These variations shall be described herein as the various examples are set forth. The disclosure now turns to FIG. 1.

FIG. 1 illustrates an example network device 110 suitable for implementing the present invention. Network device 110 includes a master central processing unit (CPU) 162, interfaces 168, and a bus 115 (e.g., a PCI bus). When acting under the control of appropriate software or firmware, the CPU 162 is responsible for executing packet management, error detection, and/or routing functions, such as miscabling detection functions, for example. The CPU 162 preferably accomplishes all these functions under the control of software including an operating system and any appropriate applications software. CPU 162 may include one or more processors 163 such as a processor from the Motorola family of microprocessors or the MIPS family of microprocessors. In an alternative embodiment, processor 163 is specially designed hardware for controlling the operations of router 110. In a specific embodiment, a memory 161 (such as non-volatile RAM and/or ROM) also forms part of CPU 162. However, there are many different ways in which memory could be coupled to the system.

The interfaces 168 are typically provided as interface cards (sometimes referred to as "line cards"). Generally, they control the sending and receiving of data packets over the network and sometimes support other peripherals used with the router 110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 162 to efficiently perform routing computations, network diagnostics, security functions, etc.

Although the system shown in FIG. 1 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 161) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 2B:
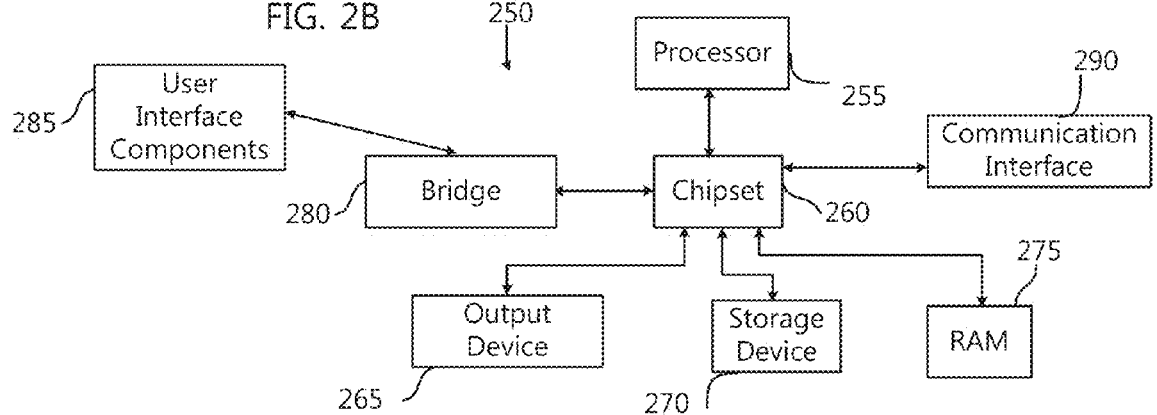
FIGS. 2A and 2B illustrate example system examples in accordance with various aspects.
Figure 2A:
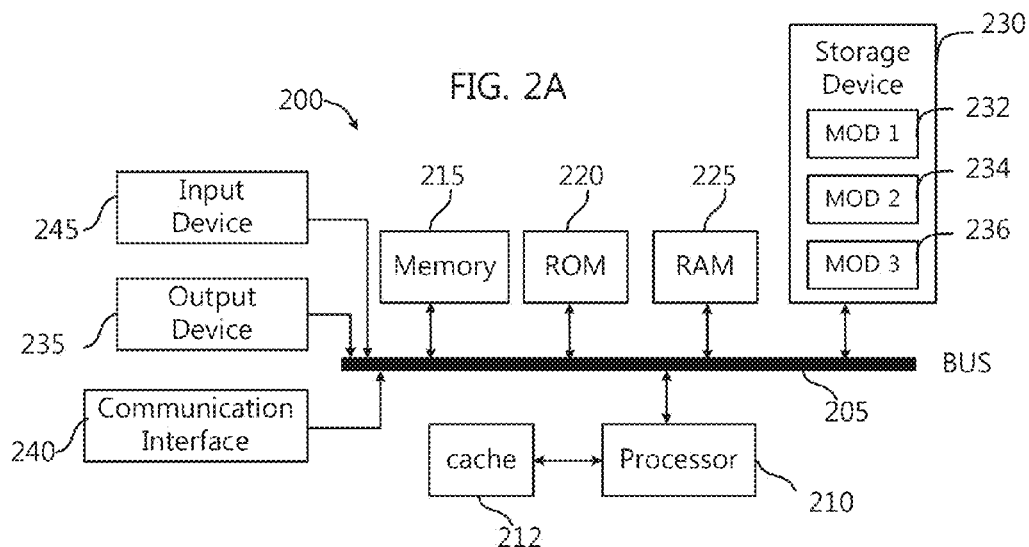

FIG. 2A, and FIG. 2B illustrate example possible system examples in accordance with various aspects. The more appropriate embodiment will be apparent to those of ordinary skill in the art when practicing the present technology. Persons of ordinary skill in the art will also readily appreciate that other system examples are possible.

FIG. 2A illustrates a conventional system bus computing system architecture 200 wherein the components of the system are in electrical communication with each other using a bus 205. Example system 200 includes a processing unit (CPU or processor) 210 and a system bus 205 that couples various system components including the system memory 215, such as read only memory (ROM) 220 and random access memory (RAM) 225, to the processor 210. The system 200 can include a cache of high-speed memory connected directly with, in close proximity to, or integrated as part of the processor 210. The system 200 can copy data from the memory 215 and/or the storage device 230 to the cache 212 for quick access by the processor 210. In this way, the cache can provide a performance boost that avoids processor 210 delays while waiting for data. These and other modules can control or be configured to control the processor 210 to perform various actions. Other system memory 215 may be available for use as well. The memory 215 can include multiple different types of memory with different performance characteristics. The processor 210 can include any general purpose processor and a hardware module or software module, such as module 1 232, module 2 234, and module 3 236 stored in storage device 230, configured to control the processor 210 as well as a special-purpose processor where software instructions are incorporated into the actual processor design. The processor 210 may essentially be a completely self-contained computing system, containing multiple cores or processors, a bus, memory controller, cache, etc. A multi-core processor may be symmetric or asymmetric.

To enable user interaction with the computing device 200, an input device 245 can represent any number of input mechanisms, such as a microphone for speech, a touch-sensitive screen for gesture or graphical input, keyboard, mouse, motion input, speech and so forth. An output device 235 can also be one or more of a number of output mechanisms known to those of skill in the art. In some instances, multimodal systems can enable a user to provide multiple types of input to communicate with the computing device 200. The communications interface 240 can generally govern and manage the user input and system output. There is no restriction on operating on any particular hardware arrangement and therefore the basic features here may easily be substituted for improved hardware or firmware arrangements as they are developed.

Storage device 230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 225, read only memory (ROM) 220, and hybrids thereof.

The storage device 230 can include software modules 232, 234, 236 for controlling the processor 210. Other hardware or software modules are contemplated. The storage device 230 can be connected to the system bus 205. In one aspect, a hardware module that performs a particular function can include the software component stored in a computer-readable medium in connection with the necessary hardware components, such as the processor 210, bus 205, output device 235 (e.g., a display), and so forth, to carry out the function.

FIG. 2B illustrates a computer system 250 having a chipset architecture that can be used in executing the described method and generating and displaying a graphical user interface (GUI). Computer system 250 is an example of computer hardware, software, and firmware that can be used to implement the disclosed technology. System 250 can include a processor 255, representative of any number of physically and/or logically distinct resources capable of executing software, firmware, and hardware configured to perform identified computations. Processor 255 can communicate with a chipset 260 that can control input to and output from processor 255. In this example, chipset 260 outputs information to output 265, such as a display, and can read and write information to storage device 270, which can include magnetic media, and solid state media, for example. Chipset 260 can also read data from and write data to RAM 275. A bridge 280 for interfacing with a variety of user interface components 285 can be provided for interfacing with chipset 260. Such user interface components 285 can include a keyboard, a microphone, touch detection and processing circuitry, a pointing device, such as a mouse, and so on. In general, inputs to system 250 can come from any of a variety of sources, machine generated and/or human generated.

Chipset 260 can also interface with one or more communication interfaces 290 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 255 analyzing data stored in storage 270 or RAM 275. Further, the machine can receive inputs from a user via user interface components 285 and execute appropriate functions, such as browsing functions by interpreting these inputs using processor 255.

It can be appreciated that example systems 200 and 250 can have more than one processor 210 or be part of a group or cluster of computing devices networked together to provide greater processing capability.

Figure 3:
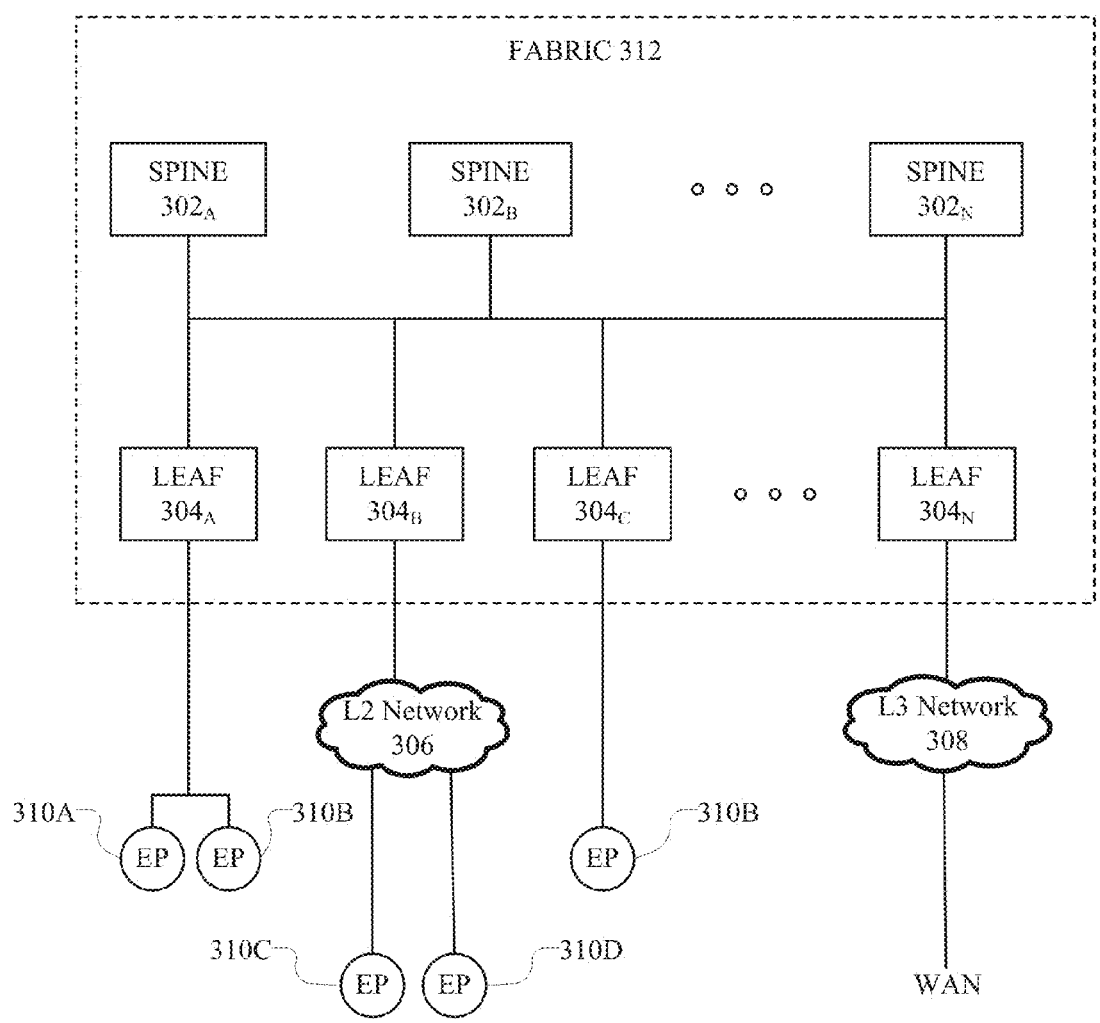
FIG. 3 illustrates a schematic block diagram of an example architecture for a network fabric in accordance with various aspects.

FIG. 3 illustrates a schematic block diagram of an example architecture 300 for a network fabric 312. The network fabric 312 can include spine switches $302_A$, $302_B$, ..., $302_N$ (collectively "302") connected to leaf switches $304_A$, $304_B$, $304_C$, ..., $304_N$ (collectively "304") in the network fabric 312.

Spine switches 302 can be L3 switches in the fabric 312. However, in some cases, the spine switches 302 can also, or otherwise, perform L2 functionalities. Further, the spine switches 302 can support various capabilities, such as 40 or 10 Gbps Ethernet speeds. To this end, the spine switches 302 can include one or more 40 Gigabit Ethernet ports. Each port can also be split to support other speeds. For example, a 40 Gigabit Ethernet port can be split into four 10 Gigabit Ethernet ports.

In some examples, one or more of the spine switches 302 can be configured to host a proxy function that performs a lookup of the endpoint address identifier to locator mapping in a mapping database on behalf of leaf switches 304 that do not have such mapping. The proxy function can do this by parsing through the packet to the encapsulated, tenant packet to get to the destination locator address of the tenant. The spine switches 302 can then perform a lookup of their local mapping database to determine the correct locator address of the packet and forward the packet to the locator address without changing certain fields in the header of the packet.

When a packet is received at a spine switch $302_i$, the spine switch $302_i$ can first check if the destination locator address is a proxy address. If so, the spine switch $302_i$ can perform the proxy function as previously mentioned. If not, the spine switch $302_i$ can lookup the locator in its forwarding table and forward the packet accordingly.

Spine switches 302 connect to leaf switches 304 in the fabric 312. Leaf switches 304 can include access ports (or non-fabric ports) and fabric ports. Fabric ports can provide uplinks to the spine switches 302, while access ports can provide connectivity for devices, hosts, endpoints, VMs, or external networks to the fabric 312.

Leaf switches 304 can reside at the edge of the fabric 312, and can thus represent the physical network edge. In some cases, the leaf switches 304 can be top-of-rack ("ToR") switches configured according to a ToR architecture. In other cases, the leaf switches 304 can be aggregation switches in any particular topology, such as end-of-row (EoR) or middle-of-row (MoR) topologies. The leaf switches 304 can also represent aggregation switches, for example.

The leaf switches 304 can be responsible for routing and/or bridging the tenant packets and applying network policies. In some cases, a leaf switch can perform one or more additional functions, such as implementing a mapping cache, sending packets to the proxy function when there is a miss in the cache, encapsulate packets, enforce ingress or egress policies, etc.

Moreover, the leaf switches 304 can contain virtual switching functionalities, such as a virtual tunnel endpoint (VTEP) function as explained below in the discussion of VTEP 408 in FIG. 4. To this end, leaf switches 304 can connect the fabric 312 to an overlay network, such as overlay network 400 illustrated in FIG. 4.

Network connectivity in the fabric 312 can flow through the leaf switches 304. Here, the leaf switches 304 can provide servers, resources, endpoints, external networks, or VMs access to the fabric 312, and can connect the leaf switches 304 to each other. In some cases, the leaf switches 304 can connect EPGs to the fabric 312 and/or any external networks. Each EPG can connect to the fabric 312 via one of the leaf switches 304, for example.

Endpoints 310A-E (collectively "310") can connect to the fabric 312 via leaf switches 304. For example, endpoints 310A and 310B can connect directly to leaf switch 304A, which can connect endpoints 310A and 310B to the fabric 312 and/or any other one of the leaf switches 304. Similarly, endpoint 310E can connect directly to leaf switch 304C, which can connect endpoint 310E to the fabric 312 and/or any other of the leaf switches 304. On the other hand, endpoints 310C and 310D can connect to leaf switch 304B via L2 network 306. Similarly, the wide area network (WAN) can connect to the leaf switches 304C or 304D via L3 network 308.

Endpoints 310 can include any communication device, such as a computer, a server, a switch, a router, etc. In some cases, the endpoints 310 can include a server, hypervisor, or switch configured with a VTEP functionality which connects an overlay network, such as overlay network 400 below, with the fabric 312. For example, in some cases, the endpoints 310 can represent one or more of the VTEPs 408A-D illustrated in FIG. 4. Here, the VTEPs 408A-D can connect to the fabric 312 via the leaf switches 304. The overlay network can host physical devices, such as servers, applications, EPGs, virtual segments, virtual workloads, etc. In addition, the endpoints 310 can host virtual workload(s), clusters, and applications or services, which can connect with the fabric 312 or any other device or network, including an external network. For example, one or more endpoints 310 can host, or connect to, a cluster of load balancers or an EPG of various applications.

Although the fabric 312 is illustrated and described herein as an example leaf-spine architecture, one of ordinary skill in the art will readily recognize that the subject technology can be implemented based on any network fabric, including any data center or cloud network fabric. Indeed, other architectures, designs, infrastructures, and variations are contemplated herein.

Figure 4:
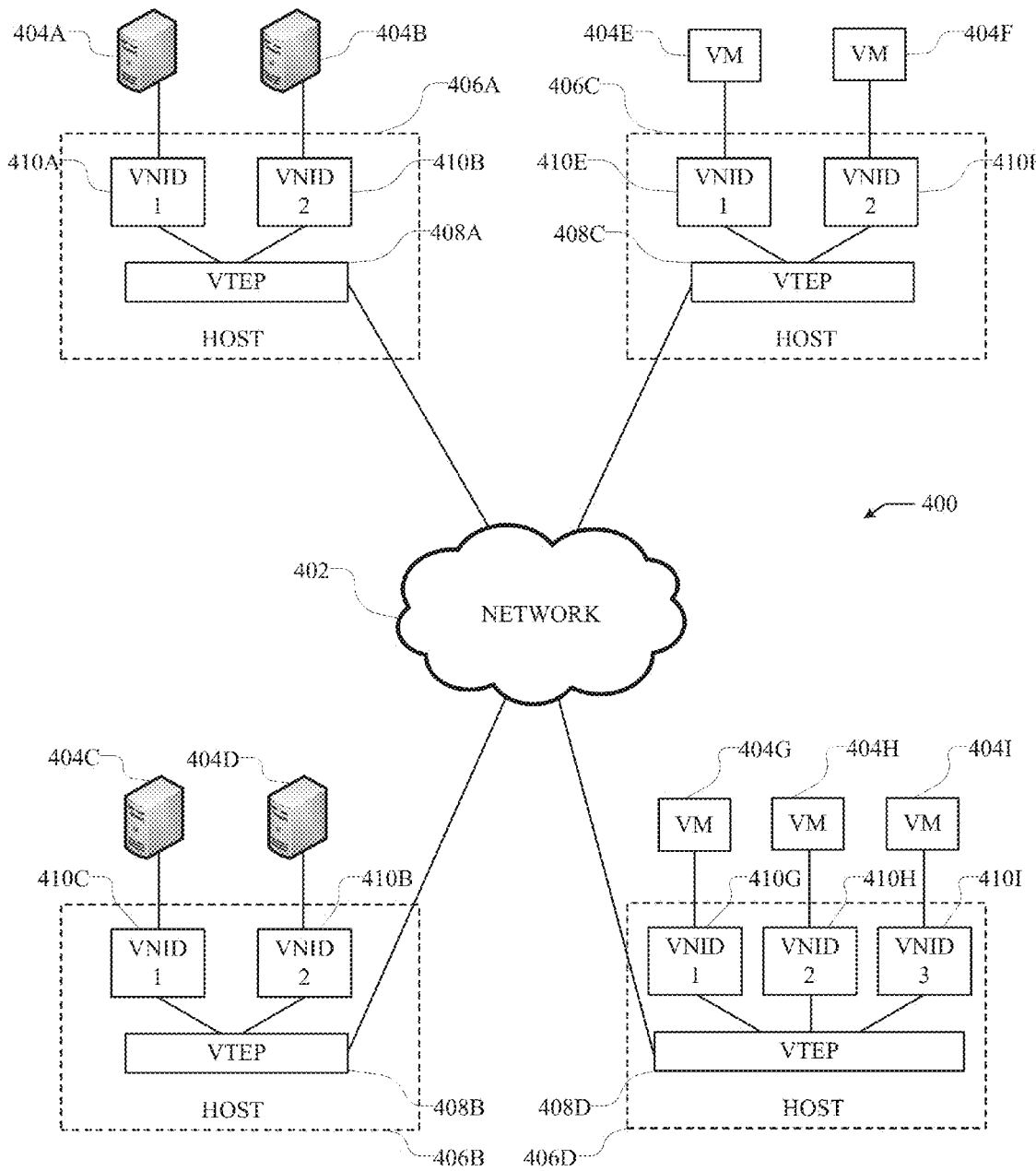
FIG. 4 illustrates an example overlay network in accordance with various aspects.

FIG. 4 illustrates an example overlay network 400. Overlay network 400 uses an overlay protocol, such as VXLAN, VGRE, VO3, or STT, to encapsulate traffic in L2 and/or L3 packets which can cross overlay L3 boundaries in the network. As illustrated in FIG. 4, overlay network 400 can include hosts 406A-D interconnected via network 402.

Network 402 can include a packet network, such as an IP network, for example. Moreover, network 402 can connect the overlay network 400 with the fabric 312 in FIG. 3. For example, VTEPs 408A-D can connect with the leaf switches 304 in the fabric 312 via network 402.

Hosts 406A-D include virtual tunnel end points (VTEP) 408A-D, which can be virtual nodes or switches configured to encapsulate and de-encapsulate data traffic according to a specific overlay protocol of the network 400, for the various virtual network identifiers (VNIDs) 410A-I. Moreover, hosts 406A-D can include servers containing a VTEP functionality, hypervisors, and physical switches, such as L3 switches, configured with a VTEP functionality. For example, hosts 406A and 406B can be physical switches configured to run VTEPs 408A-B. Here, hosts 406A and 406B can be connected to servers 404A-D, which, in some cases, can include virtual workloads through VMs loaded on the servers, for example.

In some examples, network 400 can be a VXLAN network, and VTEPs 408A-D can be VXLAN tunnel end points. However, as one of ordinary skill in the art will readily recognize, network 400 can represent any type of overlay or software-defined network, such as NVGRE, STT, or even overlay technologies yet to be invented.

The VNIDs can represent the segregated virtual networks in overlay network 400. Each of the overlay tunnels (VTEPs 408A-D) can include one or more VNIDs. For example, VTEP 408A can include VNIDs 1 and 2, VTEP 408B can include VNIDs 1 and 3, VTEP 408C can include VNIDs 1 and 2, and VTEP 408D can include VNIDs 1-3. As one of ordinary skill in the art will readily recognize, any particular VTEP can, in other examples, have numerous VNIDs, including more than the 3 VNIDs illustrated in FIG. 4.

The traffic in overlay network 400 can be segregated logically according to specific VNIDs. This way, traffic intended for VNID 1 can be accessed by devices residing in VNID 1, while other devices residing in other VNIDs (e.g., VNIDs 2 and 3) can be prevented from accessing such traffic. In other words, devices or endpoints connected to specific VNIDs can communicate with other devices or endpoints connected to the same specific VNIDs, while traffic from separate VNIDs can be isolated to prevent devices or endpoints in other specific VNIDs from accessing traffic in different VNIDs.

Servers 404A-D and VMs 404E-I can connect to their respective VNID or virtual segment, and communicate with other servers or VMs residing in the same VNID or virtual segment. For example, server 404A can communicate with server 404C and VMs 404E and 404G because they all reside in the same VNID, viz., VNID 1. Similarly, server 404B can communicate with VMs 404F, H because they all reside in VNID 2. VMs 404E-I can host virtual workloads, which can include application workloads, resources, and services, for example. However, in some cases, servers 404A-D can similarly host virtual workloads through VMs hosted on the servers 404A-D. Moreover, each of the servers 404A-D and VMs 404E-I can represent a single server or VM, but can also represent multiple servers or VMs, such as a cluster of servers or VMs.

VTEPs 408A-D can encapsulate packets directed at the various VNIDs 1-3 in the overlay network 400 according to the specific overlay protocol implemented, such as VXLAN, so traffic can be properly transmitted to the correct VNID and recipient(s). Moreover, when a switch, router, or other network device receives a packet to be transmitted to a recipient in the overlay network 400, it can analyze a routing table, such as a lookup table, to determine where such packet needs to be transmitted so the traffic reaches the appropriate recipient. For example, if VTEP 408A receives a packet from endpoint 404B that is intended for endpoint 404H, VTEP 408A can analyze a routing table that maps the intended endpoint, endpoint 404H, to a specific switch that is configured to handle communications intended for endpoint 404H. VTEP 408A might not initially know, when it receives the packet from endpoint 404B, that such packet should be transmitted to VTEP 408D in order to reach endpoint 404H. Accordingly, by analyzing the routing table, VTEP 408A can lookup endpoint 404H, which is the intended recipient, and determine that the packet should be transmitted to VTEP 408D, as specified in the routing table based on endpoint-to-switch mappings or bindings, so the packet can be transmitted to, and received by, endpoint 404H as expected.

However, continuing with the previous example, in many instances, VTEP 408A may analyze the routing table and fail to find any bindings or mappings associated with the intended recipient, e.g., endpoint 404H. Here, the routing table may not yet have learned routing information regarding endpoint 404H. In this scenario, the VTEP 408A may likely broadcast or multicast the packet to ensure the proper switch associated with endpoint 404H can receive the packet and further route it to endpoint 404H.

In some cases, the routing table can be dynamically and continuously modified by removing unnecessary or stale entries and adding new or necessary entries, in order to maintain the routing table up-to-date, accurate, and efficient, while reducing or limiting the size of the table.

As one of ordinary skill in the art will readily recognize, the examples and technologies provided above are simply for clarity and explanation purposes, and can include many additional concepts and variations.

Figure 5:
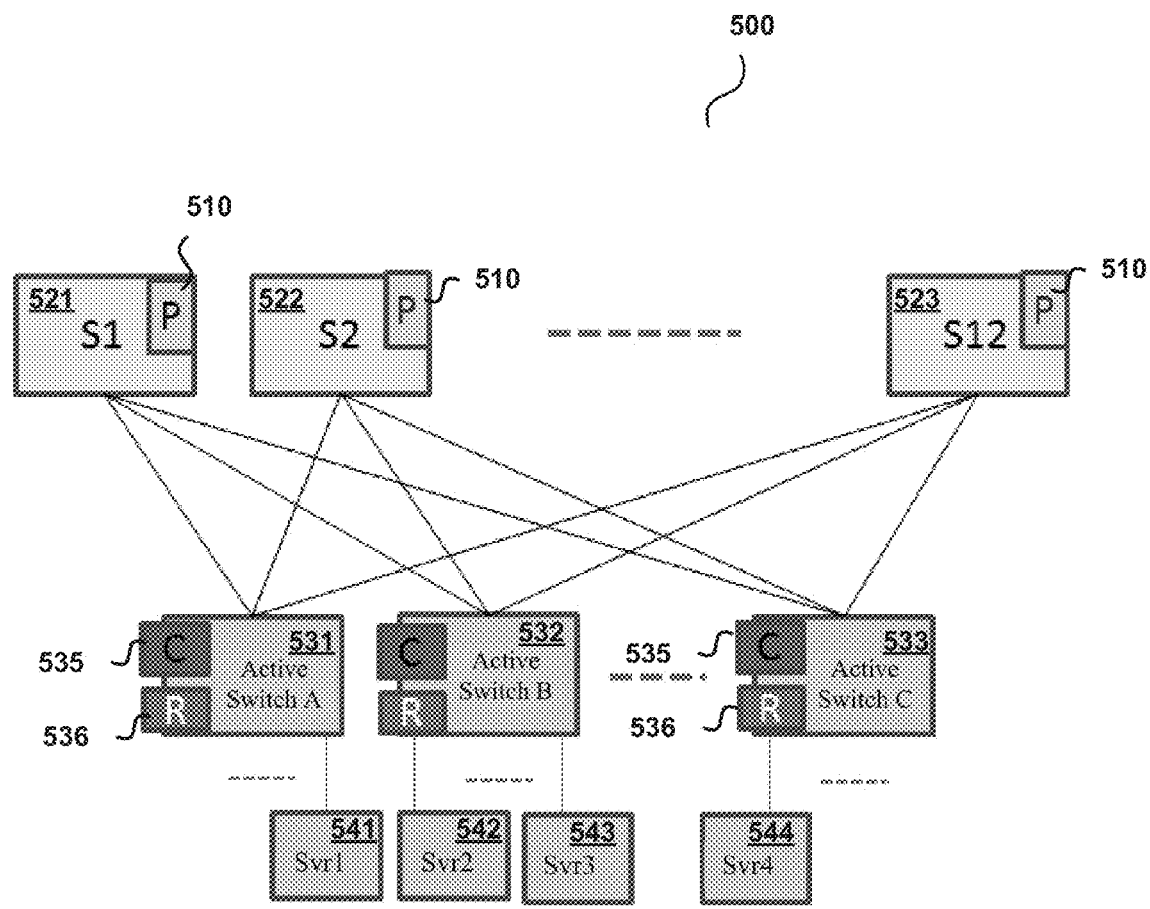
FIG. 5 illustrates a simplified architecture of a network system in accordance with various aspects.

FIG. 5 illustrates a simplified architecture of a network system 500 in accordance with various examples. In this example, the network system 500 includes a plurality of active switches (e.g., Active Switch A 531, Active Switch B 532, and Active Switch C 533), a plurality of servers (e.g., Svr 541, Svr2 542, Svr3 543 and Svr 4 544), and multiple switch systems (e.g., S1 521, S2 522 and S3 523). The active switches can be top of rack (ToR) switches (i.e., switches installed inside a rack) and end of row (EoR) switches (i.e., switches placed at either end of server rows). An active switch may contain a conversation drive cache "C" 535 and a longest prefix match (LPM) route cache "R" 536. The conversation drive cache 535 may contain network usage information regarding applications, top talkers and conversations that can be used to optimize usage of the corresponding active switch. The LPM route cache 536 may contain external routes and routes to network switch devices that the active switch is connected to. Although only switch devices 521-523, active switches 531-533 and servers 541-544 are shown within the system 500 in FIG. 5, various types of electronic or computing devices that are capable of receiving and forwarding network packets may also be included. The computing device may use operating systems that include, but are not limited to, Android, Berkeley Software Distribution (BSD), iPhone OS (iOS), Linus, OS X, Unix-like Real-time Operating System (e.g., QNX), Microsoft Windows, Window Phone, and IBM z/OS.

Depending on the desired implementation in the system 500, a variety of networking and messaging protocols may be used, including but not limited to TCP/IP, open systems interconnection (OSI), file transfer protocol (FTP), universal plug and play (UpnP), network file system (NFS), common internet file system (CIFS), AppleTalk etc. As would be appreciated by those skilled in the art, the system 500 illustrated in FIG. 5 is used for purposes of explanation, a network system may be implemented with many variations, as appropriate, in the configuration of network platform in accordance with various aspects of the present disclosure.

In this example, when a server sends a packet to one of the active switches (e.g., Active Switch A 531, Active Switch B 532, and Active Switch C 533), the active switch can forward the packet according to a forwarding table residing on the active switch. If a destination of the packet is connected to the active switch, the packet can be forwarded directly to the destination. In some examples, a packet may be forwarded to its destination based at least upon a corresponding conversation learnt entry in the conversation driven cache 535. In some examples, if a destination of the packet is neither connected to the active switch nor having a corresponding entry in the conversation driven cache 535, the packet can be forwarded to one of proxy function modules 510. In some implementations, the packet is forwarded to a proxy function module 510 residing on a switch device based upon corresponding information stored in the LPM route cache 536. In some examples, the packet can be forwarded with load-balancing to a proxy function module 510 residing on one of the multiple switch devices. The proxy function module 510 includes a lookup table that contains addresses of all servers and/or active switches of the system 500. According to one of the corresponding entries in the lookup table, the packet can be sent to a selected active switch, which subsequently sends the packet to its destination.

For example, the Svr2 542 sends to the Active Switch B 532 a packet with a destination to the Svr4 544. Assuming by looking up the conversation drive cache 535 and longest prefix match (LPM) route cache 536, the Active Switch B 532 still doesn't know where is the Svr4. The Active Switch B 532 then forwards the packet to the proxy function module 510 residing on one of the switch systems, assuming the switch system 522. The proxy function module 510 residing on the switch system 522 can determine an active switch that the Svr4 is connected to by looking up the lookup table that contains addresses of all servers and/or active switches of the system 500. The switch system 522 then sends the packet to the Active Switch C 533 that is connected to the Svr4 544. Upon receiving the packet, the Active Switch C 533 can forward the packet to the Svr4 544.

In some examples, a forwarding table residing on an active switch may only contain entries with address information of servers that are connected to the active switch. For an incoming packet with a destination address not containing in the forwarding table, the active switch can forward the packet with load-balancing to the proxy function module 510 residing on any one of the switch systems, which can ultimately deliver the packet to its final destination.

Figure 6:
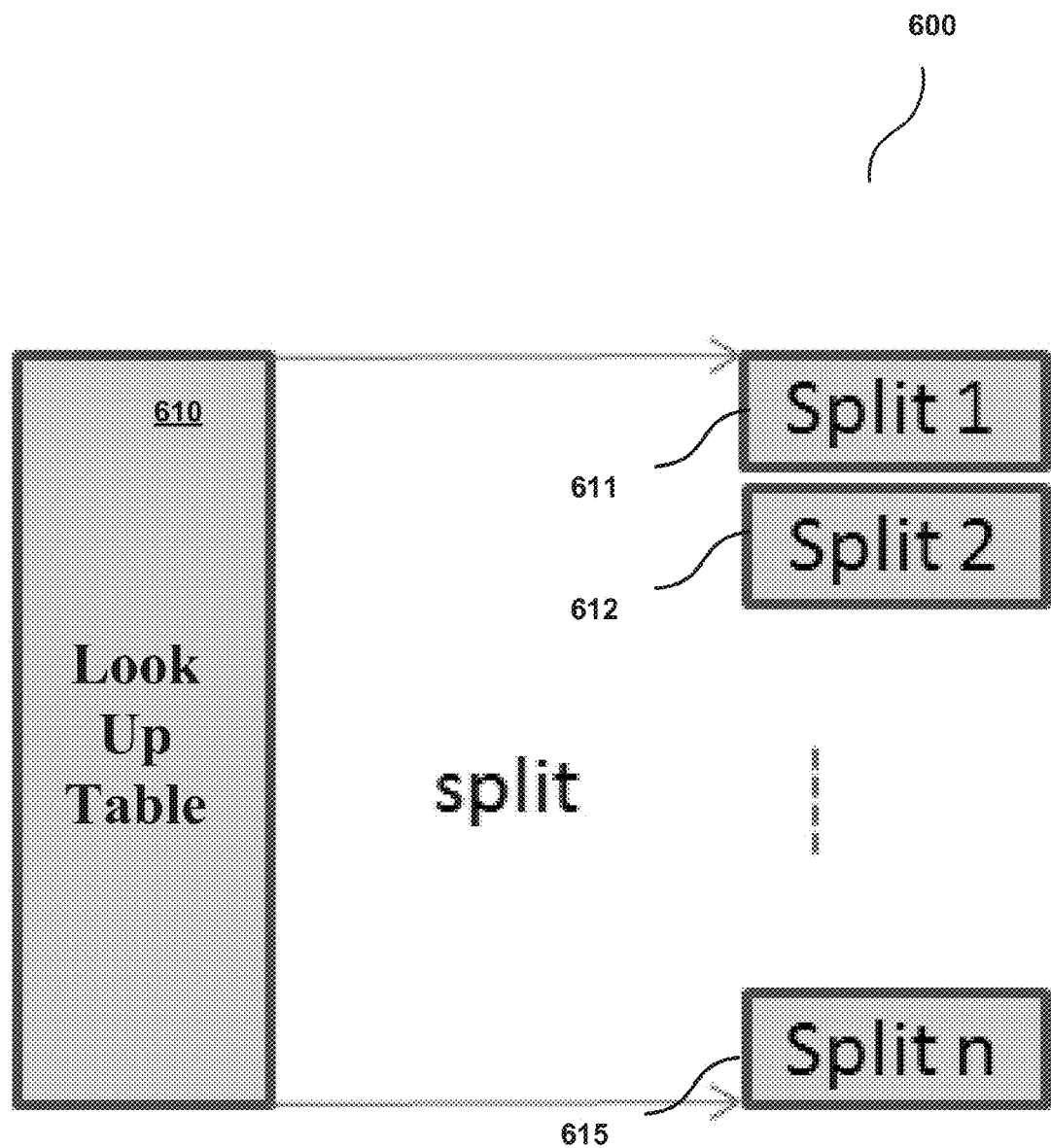
FIG. 6 illustrates an example block diagram of a plurality of lookup table subsets in accordance with various aspects.

In some examples, a lookup table of the proxy function module 510 can be sharded into a plurality of lookup table subsets, each of which contains a portion of the lookup table. FIG. 6 illustrates an example block diagram 600 of a plurality of lookup table subsets in accordance with various examples. In the example, the lookup table 610 is sharded into a plurality of lookup table subsets, such as Split1 611, Split2 612, . . . Splitn 615. A process of determining a chipset that a particular address goes to when a network switch device was programmed is called "sharding." In some examples, each of the multiple switch systems includes multiple switch chipsets (e.g., Tridents (T2s)). Each of the plurality of lookup table subsets can reside on a different one of multiple switch chipsets (e.g., T2s) of a network switch system.

Figure 7:
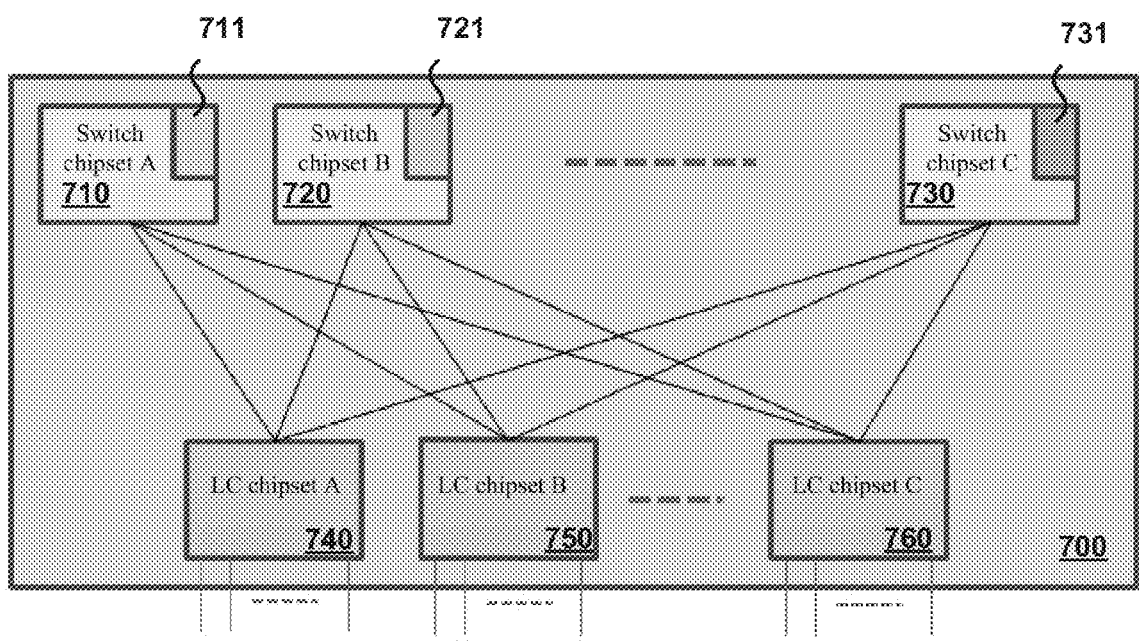
FIG. 7 illustrates an example switch system with line card chipsets and switch chipsets in accordance with various aspects.

FIG. 7 illustrates an example switch system 700 with line card chipsets and switch chipsets in accordance with various examples. In this example, the switch system 700 includes a plurality of line card (LC) chipsets (e.g., LC chipset A 740, LC chipset B 750, and LC chipset C 760) and a plurality of switch chipsets (e.g., Switch chipset A 710, Switch chipset B 720, and Switch chipset C 730). In some implementations, LC chipsets are Alpines and switch chipsets are T2s. In some examples, a lookup table of the proxy function module 510 in FIG. 5 can be sharded into a plurality of lookup table subsets. Each subset of the lookup table resides on a different one of the switch chipsets to achieve a maximum capacity for the lookup database. In this example, a fraction of the lookup table resides on the Switch chipset A 711 (in yellow), the Switch chipset B 721 (in green) and the Switch chipset C 731 (in red), respectively. When an incoming packet arrives at the switch system 700, one or more corresponding entries in the lookup table can be computed according a sharding algorithm. Based at least upon the one or more corresponding entries in the lookup table, a switch chipset containing a corresponding lookup subset can be determined. The incoming packet can then be forwarded to the switch chipset. According to the corresponding lookup subset, the switch chipset can determine an active switch connected to a destination server and subsequently send the incoming packet to the active switch. Upon receiving the incoming packet, the active switch can further forward the packet to the right destination server.

In some examples, an algorithm used in a "sharding" process is used in conjunction with synthetic IP addresses to implement a lookup table of a network switch system that can hold more than 1 million addresses. In the "sharding" process, there is no restriction on the number of supported virtual routing and forwarding (VRFs) as long as the total number of end-point identifies fits in the capacity of the lookup table.

Figure 8:
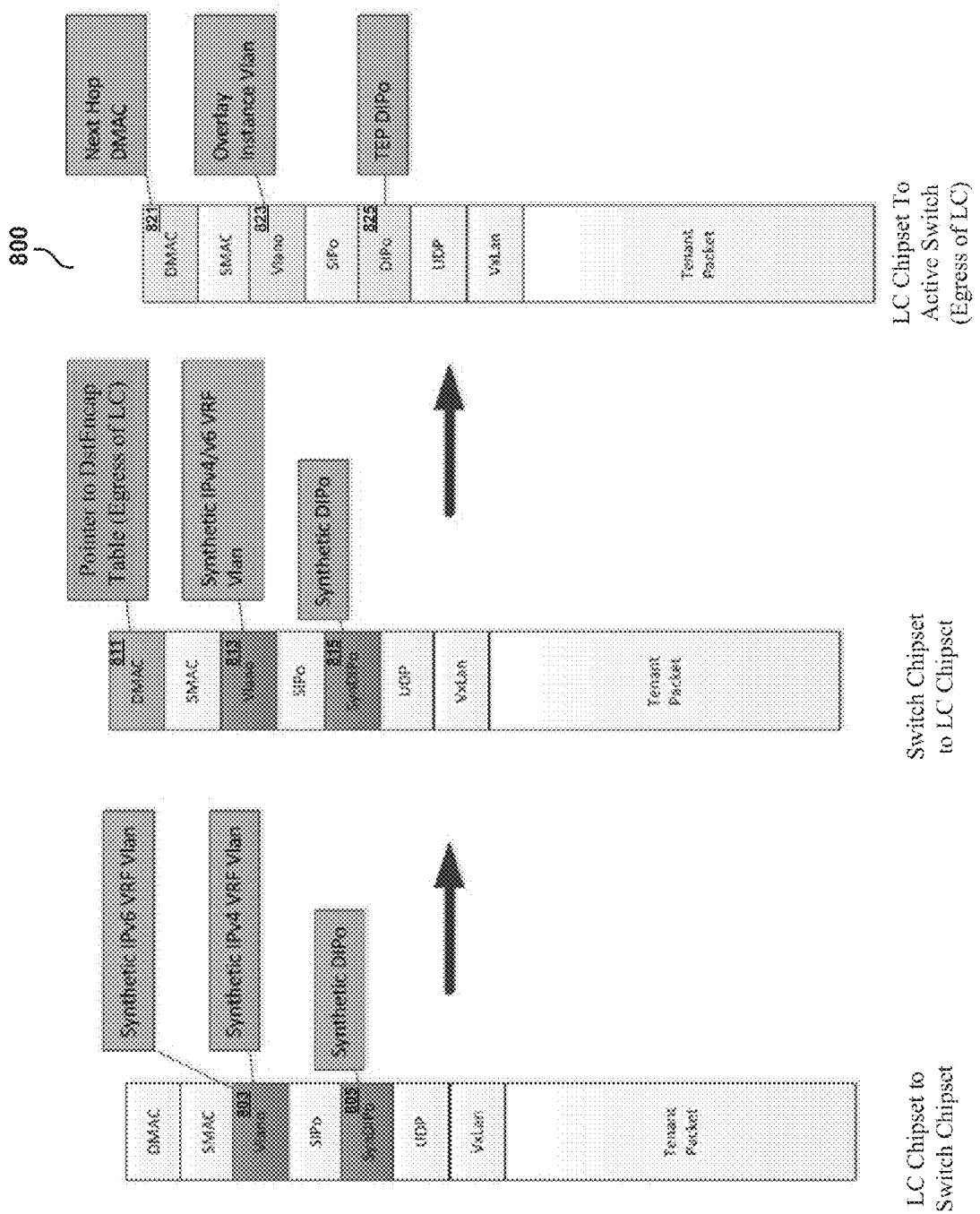
FIG. 8 illustrates an example block diagram of mapping end-point identifiers to synthetic identifiers in a network system illustrated in FIG. 5, in accordance with various aspects.

FIG. 8 illustrates an example block diagram 800 of mapping end-point identifiers to synthetic identifiers in a network system illustrated in FIG. 5 in accordance with various examples. In this example, when an incoming packet arrives at an active switch (not shown), for example the Active Switch B 532 in FIG. 5, the active switch encapsulates the incoming packet with another IP address and forwards the packet to a proxy function module residing on one of the switch systems. The incoming packet now has two IP addresses: an inner IP address header having information such as source and destination of the incoming packet, and an outer IP address including information of the source of the incoming packet and a route from the active switch to a proxy function module residing on one of the switch systems. For example, the active switch encapsulates the incoming packet with IP address fields including Vlano 803 and SynDIPo 805. In some examples, the Vlano 803 may be a synthetic IPv6 VRF Vlan (virtual local area network) address or a synthetic IPv4 VRF Vlan address. The SynDIPo 805 can be a destination IP address in the outer packet. Both the synthetic IPv4/IPv6 VRF Vlan and SynDIPo can be calculated by using synthetic operations.

In this example, a LC chipset in the switch system receives the packet and then forwards the packet to a switch chipset. The switch chipset may contain a subset of the lookup table of the proxy function module 510. The switch chipset can look up the subset of the lookup table and determine an active switch that is connected to a destination of the incoming packet. At least based upon the destination of the incoming packet, the switch chipset can update a DMAC (destination MAC) address of the packet to include a pointer to a DstEncap table that contains information of an egress LC. Subsequently, the packet can be forwarded to a LC chipset of the egress LC. The DMAC, Vlano, and DIPo addresses of the packet are then updated to include a next hop DMAC address, an overlay instance Vlan, and a TEP (Tunneling Establishment Protocol) DIPo address (e.g., IP address of an active switch connected to the destination of the packet), respectively. Finally, the packet is sent to the determined active switch to be forwarded to a destination server.

In some examples, the operations of generating synthetic identifiers can include hashing an endpoint identifier to the specific bit range of the synthetic identifiers. In some implementations, synthetic identifiers can comprise a 32 bit IPv4 address and an 8-bit VRF. Accordingly, an end-point identifier can be hashed to a 40-bit synthetic address.

In some examples, a sharding algorithm can be used to hash an IP address or synthetic address of an incoming packet and map the address to one or more corresponding entries in a lookup table of the proxy function module 510. The synthetic address of the packet can be generated from the concatenation of the packet VNID and the address of the encapsulated packet. The address may be either a Layer-2 MAC address or a Layer-3 IP address for IPv4 and IPv6, respectively. In many implementations, the synthetic address has a 40-bit value.

Since the lookup table of the proxy function module 510 contains a large number of entries (e.g., over 1 million entries), it's important to minimize hash collisions when mapping various types of end-point identifiers to synthetic addresses. In various examples, a hashing algorithm with good mixing behavior can be used for mapping of an end-point to a corresponding tunnel location. In some examples, Jenkins' "one-at-a-time" hashing algorithm is used for generating the 32-bit synthetic IPv4 address and a basic cyclic redundancy check CRC-8 (with polynomial 0x31) is used for generating the synthetic VRF. An example implementation of the Jenkins algorithm is set forth herein:

```
uint32_t jenkins_one_at_a_time_hash(char *key, size_t len){
    uint32_t hash, i;
    for(hash = i = 0; i < len; ++i) {
        hash += key[i];
        hash += (hash << 10);
        hash ^= (hash >> 6);
    }
    hash += (hash << 3);
    hash ^= (hash >> 11);
    hash += (hash << 15);
    return hash;
}
```

In some examples, an input to a hash algorithm can be 7 bytes in the IPv4 case (4-byte IPv4 address and 3-byte Virtual Extensible LAN Identifier (VNID)), 19 bytes in the IPv6 case (16-byte IPv6 address and 3-byte VNID), and 9 bytes in the L2 case (6-byte MAC address and 3-byte VNID). Similarly, a cyclic redundancy check CRC-8 can be performed over the entirety of a key. In some examples, the results of the CRC-8 of the VNID can be XOR'ed with the CRC-8 of the address. Although Jenkins' "one-at-a-time" hashing algorithm is provided herein as an example, it will be appreciated that other hashing algorithms known to those of ordinary skill in the art, such as those with good mixing behavior, can be utilized in alternative examples.

In some examples, in response to a lookup miss at a switch chipset, a default route can be used to forward an incoming packet to a different or default switch system in the system 500. Using such an approach, incoming packets with a lookup miss at a switch chipset can be forwarded to the default or different switch system that ultimately forwards the incoming packet to its destination.

In some examples, a synthetic IP address may have a most significant bit (MSB) value of "1," which corresponds to a multicast address. In some examples, the MSB bit of a synthetic IP address can be moved to the 9$^{th}$ bit of the synthetic VRF. In this way, the synthetic IP address can always correspond to a unicast address.

In some examples, a switching chipset only uses 9 bits of VRF although it can support up to 1,000 VRFs. The remaining VRFs can be utilized for infrastructure and overlay needs. In some examples, an offset can be added to a hashed value to generate a synthetic VRF to avoid certain exceptions. For example, some switch chips do not handle the case where VRF is equal to 0. In some examples, only one L3 entry per IPv6 endpoint is required by utilizing synthetic IPv4 addresses for IPv6 end-points, and 48 bit MAC addresses can be represented as a 32-bit synthetic IPv4 addresses.

Figure 9:
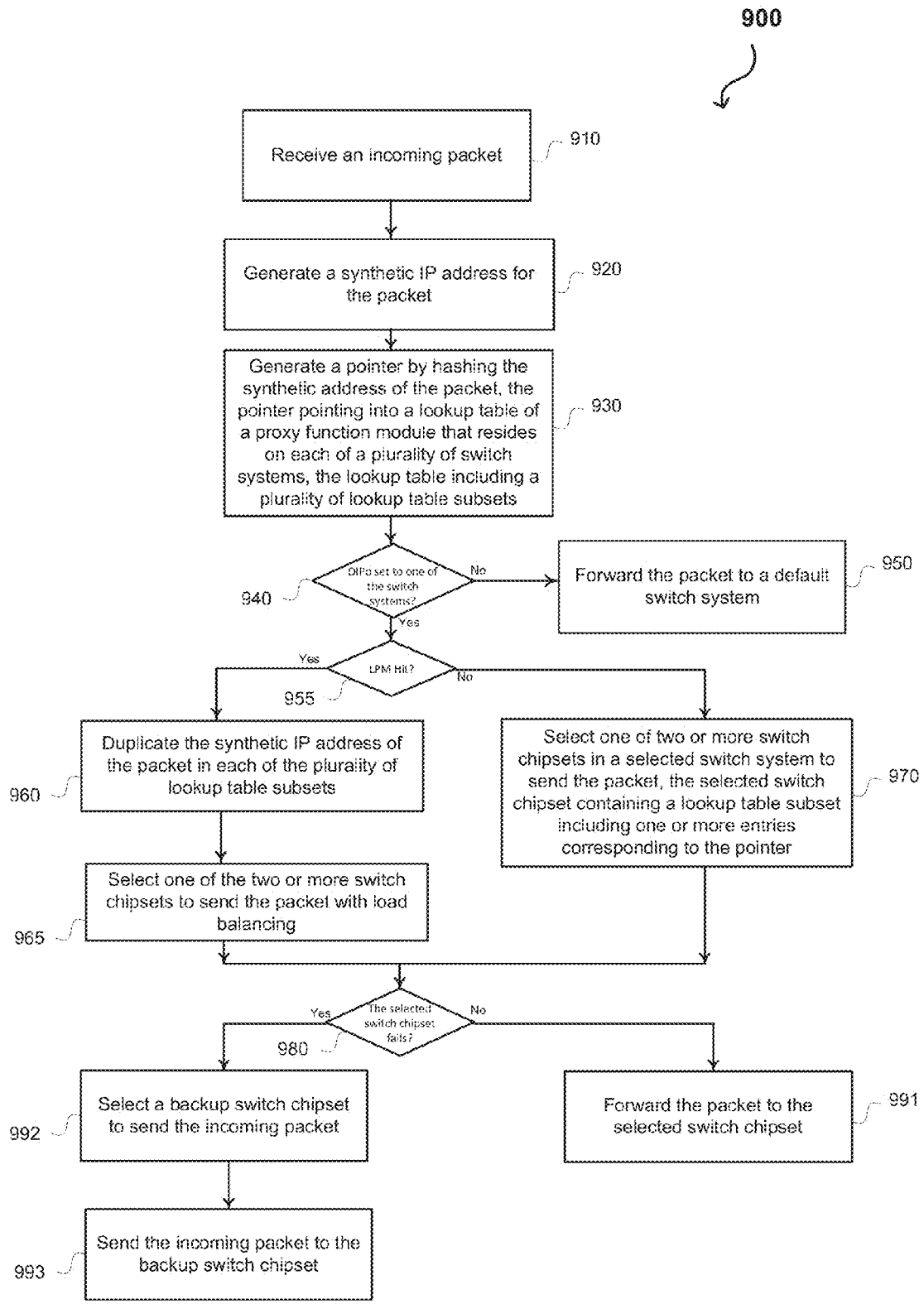
FIG. 9 illustrates an example process of address lookups in accordance with various aspects.

Having disclosed some basic system components and concepts, the disclosure now turns to the example method embodiment shown in FIG. 9. For the sake of clarity, the method is described in terms of systems 110, 200, 250, 300, 400, 500, 600, 700 and 800, as shown in FIGS. 1-8, configured to practice the method. The steps outlined herein are examples and can be implemented in any combination thereof, including combinations that exclude, add, or modify certain steps.

FIG. 9 illustrates an example process 900 of address lookups in accordance with various examples. It should be understood that there can be additional, fewer, or alternative steps performed in similar or alternative orders, or in parallel, within the scope of the various aspects of the present disclosure unless otherwise stated. The example method embodiment 900 starts with receiving an incoming packet, at step 910. A synthetic IP address of the packing can be generated at step 920. In some examples, the packet is encapsulated with two IP addresses, an inner IP address header having information such as source and destination of the incoming packet, and an outer IP address including information of the source of the incoming packet and a route to a proxy function module residing on each of a plurality of switch systems. Each of the plurality of switch systems includes two or more switch chipsets. In some examples, a synthetic destination IP address (SynDIPo) can be generated for the incoming packet based at least upon the inner IP address header.

At step 930, a pointer can be generated by hashing the synthetic address of the incoming packet. The pointer points into a lookup table of a proxy function module that resides on each of a plurality of switch systems. Each of the plurality of switch system may include two or more switch chipsets. In some examples, the lookup table can be split into a plurality of lookup table subsets. Each subset of the lookup table resides on a different one of the switch chipsets to achieve a maximum capacity for the forwarding database.

At step 940, a determination can be made on whether a destination IP address of the incoming packet is set to one of the switch systems containing the lookup table. If the destination IP address of the incoming packet is not set to one of the switch systems, the packet can be forwarded to a different or default switch system that ultimately sends the incoming packet to its destination, at step 950. In some examples, the different switch system can be selected based at least upon unmodified outer header and untag header of the incoming packet. If the destination IP address of the incoming packet is set to one of the switch systems containing the lookup table, a determination can be made on whether there is a LPM hit, at step 955.

If there is no LPM hit, one of two or more switch chipsets in a selected switch system can be selected to send the incoming packet, at step 970. The selected switch chipset contains a lookup table subset including one or more entries corresponding to the pointer. If there is a LPM hit, the synthetic IP address of the incoming packet can be duplicated in each of the plurality of lookup table subsets in the selected switch system, at step 960. In some examples, the synthetic IP address of the incoming packet can be duplicated in each of the plurality of lookup table subsets in the plurality of switch systems. One of the switch chipsets can be selected with load-balancing to send the incoming packet, at step 965.

At step 980, a determination can be made on whether the selected switch chipset fails. If the selected chipset does not fail, the incoming packet can be forwarded to the selected switch chipset, at step 991. If the selected chipset fails, a backup switch chipset can be selected to send the incoming packet, at step 992. The backup switch chipset has a lookup table or lookup table subset that contains the synthetic IP address of the incoming packet. At step 993, the incoming packet can be forwarded to the backup switch chipset.

For clarity of explanation, in some instances the present technology may be presented as including individual functional blocks including functional blocks comprising devices, device components, steps or routines in a method embodied in software, or combinations of hardware and software.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Various aspects of the present disclosure provide methods for unifying various types of end-point identifiers by mapping end-point identifiers to synthetic addresses and allowing different forms of lookups to be uniformly handled. While specific examples have been cited above showing how the optional operation may be employed in different instructions, other examples may incorporate the optional operation into different instructions. For clarity of explanation, in some instances the present disclosure may be presented as including individual functional blocks including functional blocks comprising devices, device components, steps or routines in a method embodied in software, or combinations of hardware and software.

The various examples can be further implemented in a wide variety of operating environments, which in some cases can include one or more server computers, user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

To the extent examples, or portions thereof, are implemented in hardware, the present invention may be implemented with any or a combination of the following technologies: a discrete logic circuit(s) having logic gates for implementing logic functions upon data signals, an application specific integrated circuit (ASIC) having appropriate combinational logic gates, programmable hardware such as a programmable gate array(s) (PGA), a field programmable gate array (FPGA), etc.

Most examples utilize at least one network that would be familiar to those skilled in the art for supporting communications using any of a variety of commercially-available protocols, such as TCP/IP, OSI, FTP, UPnP, NFS, CIFS, AppleTalk etc. The network can be, for example, a local area network, a wide-area network, a virtual private network, the Internet, an intranet, an extranet, a public switched telephone network, an infrared network, a wireless network and any combination thereof.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include server computers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

In examples utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from open market.

The server farm can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared computing device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate examples may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and computing media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various aspects of the present disclosure.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
receiving an incoming packet;
encapsulating the incoming packet with an outer IP address to generate an encapsulated packet;
generating a synthetic IP address for the incoming packet according to a hash algorithm by concatenating a virtual network identifier (VNID) of the incoming packet and the outer IP address of the encapsulated packet;
generating a pointer by hashing the synthetic IP address of the incoming packet, the pointer pointing into a lookup table of a proxy function module that resides on each of a plurality of switch systems, and wherein the hashing is performed using a hash algorithm that has an input including at least one of a combination of: an IPv4 address and a VNID, an IPv6 address and a VNID, or a MAC address and a VNID, and wherein the lookup table includes a plurality of lookup table subsets, and each of the plurality of switch systems contains two or more switch chipsets, each of the plurality of lookup table subsets residing on a different one of the two or more switch chipsets in one of the plurality of switch systems;
selecting one of the switch systems to send the incoming packet;
selecting one of the two or more switch chipsets in the selected switch system to send the incoming packet, a selected switch chipset containing a lookup table subset including one or more entries corresponding to the pointer;
in response to a longest prefix match (LPM) hit, duplicating the synthetic IP address of the incoming packet into each of the plurality of lookup table subsets; and
sending the incoming packet to the selected switch chipset of the selected switch system.

2. The computer-implemented method of claim 1, further comprising:
in response to a determination that the pointer is not correlated to any entry in the lookup table, sending the incoming packet to a default switch system configured to forward the incoming packet to its destination.

3. The computer-implemented method of claim 1, further comprising:
in response to a determination that there is a longest prefix match (LPM) hit, duplicating the synthetic IP address of the incoming packet into each lookup table subset residing on the switch chipsets in the plurality of switch systems; and
selecting one of the switch chipsets in the plurality of switch systems to send the incoming packet with load-balancing.

4. The computer-implemented method of claim 1, further comprising:
in response to a determination that the selected chipset fails, selecting a backup switch chipset in the plurality of switch systems, the backup switch chipset containing a lookup table subset including one or more entries corresponding to the pointer; and
sending the incoming packet to the backup switch chipset.

5. The computer-implemented method of claim 1, further comprising:
generating the synthetic IP address by hashing an IP address of the incoming packet to a specific bit range of the synthetic IP address.

6. The computer-implemented method of claim 1, wherein the hash algorithm is Jenkins' one-at-a-time hashing algorithm.

7. The computer-implemented method of claim 1, wherein the incoming packet has an IP address including at least one of a Layer-2 MAC address, a Layer-3 IPv4 address, or a Layer-3 IPv6 address.

8. A system, comprising:
at least one processor; and
memory including instructions that, when executed by the at least one processor, cause the system to:
receive an incoming packet;
encapsulate the incoming packet with an outer IP address to generate an encapsulated packet;
generate a synthetic IP address for the incoming packet according to a hash algorithm by concatenating a virtual network identifier (VNID) of the incoming packet and the outer IP address of the encapsulated packet;
generate a pointer by hashing the synthetic IP address of the incoming packet, the pointer pointing into a lookup table of a proxy function module that resides on each of a plurality of switch systems, and wherein the hashing is performed using a hash algorithm that has an input including at least one of a combination of: an IPv4 address and a VNID, an IPv6 address and a VNID, or a MAC address and a VNID, and wherein the lookup table includes a plurality of lookup table subsets, and each of the plurality of switch systems contains two or more switch chipsets, each of the plurality of lookup table subsets residing on a different one of the two or more switch chipsets in one of the plurality of switch systems;
select one of the switch systems to send the incoming packet;
select one of the two or more switch chipsets in the selected switch system to send the incoming packet, a selected switch chipset containing a lookup table subset including one or more entries corresponding to the pointer;
in response to a longest prefix match (LPM) hit, duplicating the synthetic IP address of the incoming packet into each of the plurality of lookup table subsets; and
send the incoming packet to the selected switch chipset of the selected switch system.

9. The system of claim 8, wherein the instructions when executed further cause the system to:
in response to a determination that there is a longest prefix match (LPM) hit, duplicate the synthetic IP address of the incoming packet into each lookup table subset residing on the switch chipsets in the plurality of switch systems; and
select one of the switch chipsets in the plurality of switch systems to send the incoming packet with load-balancing.

10. A non-transitory computer-readable storage medium including instructions that, when executed by at least one processor of a computing system, cause the computing system to:
receive an incoming packet;
encapsulate the incoming packet with an outer IP address to generate an encapsulated packet;
generate a synthetic IP address for the incoming packet according to a hash algorithm by concatenating a virtual network identifier (VNID) of the incoming packet and the outer IP address of the encapsulated packet;
generate a pointer by hashing the synthetic IP address of the incoming packet, the pointer pointing into a lookup table of a proxy function module that resides on each of a plurality of switch systems, and wherein the hashing is performed using a hash algorithm that has an input including at least one of a combination of: an IPv4 address and a VNID, an IPv6 address and a VNID, or a MAC address and a VNID, and wherein the lookup table includes a plurality of lookup table subsets, and each of the plurality of switch systems contains two or more switch chipsets, each of the plurality of lookup table subsets residing on a different one of the two or more switch chipsets in one of the plurality of switch systems;
select one of the switch systems to send the incoming packet;
select one of the two or more switch chipsets in the selected switch system to send the incoming packet, a selected switch chipset containing a lookup table subset including one or more entries corresponding to the pointer;
in response to a longest prefix match (LPM) hit, duplicating the synthetic IP address of the incoming packet into each of the plurality of lookup table subsets; and
send the incoming packet to the selected switch chipset of the selected switch system.

11. The non-transitory computer-readable storage medium of claim 10, wherein the instructions when executed further cause the system to:
in response to a determination that the selected chipset fails, select a backup switch chipset in the plurality of switch systems, the backup switch chipset containing a lookup table subset including one or more entries corresponding to the pointer; and
send the incoming packet to the backup switch chipset.

* * * * *